(12) United States Patent
Yin (10) Patent No.: US 9,107,181 B2
(45) Date of Patent: Aug. 11, 2015

(54) LOCATION-BASED POSITIONING METHOD AND SYSTEM

(71) Applicant: BEIJING BAIDU NETCOM SCIENCE AND TECHNOLOGY CO., LTD., Beijing (CN)

(72) Inventor: Lei Yin, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/358,236

(22) PCT Filed: Nov. 16, 2012

(86) PCT No.: PCT/CN2012/084774
§ 371 (c)(1),
(2) Date: May 15, 2014

(87) PCT Pub. No.: WO2013/071885
PCT Pub. Date: May 23, 2013

(65) Prior Publication Data
US 2014/0315583 A1 Oct. 23, 2014

(30) Foreign Application Priority Data
Nov. 16, 2011 (CN) .......................... 2011 1 0363788

(51) Int. Cl.
| | | |
|---|---|---|
| H04W 24/00 | (2009.01) | |
| H04H 20/74 | (2008.01) | |
| H04M 3/42 | (2006.01) | |
| H04B 7/185 | (2006.01) | |
| H04W 64/00 | (2009.01) | |
| G01S 5/02 | (2010.01) | |
| H04W 4/02 | (2009.01) | |
| G01C 21/30 | (2006.01) | |

(52) U.S. Cl.
CPC ............. *H04W 64/006* (2013.01); *G01C 21/30* (2013.01); *G01S 5/0294* (2013.01); *H04W 4/027* (2013.01)

(58) Field of Classification Search
CPC ... H04W 4/027; H04W 64/00; H04W 64/006; H04W 4/028; H04W 4/043
USPC ............ 455/456.2, 456.1, 41.1, 456.3, 456.5, 455/456.6, 414.2
See application file for complete search history.

(56) References Cited

U.S. PATENT DOCUMENTS

| | | |
|---|---|---|
| 2010/0248746 A1 | 9/2010 | Saaverdra et al. |
| 2013/0053067 A1* | 2/2013 | Aggarwal et al. .......... 455/456.2 |

FOREIGN PATENT DOCUMENTS

| | | |
|---|---|---|
| CN | 101038178 A | 9/2007 |
| CN | 101055190 A | 10/2007 |
| CN | 101308487 A | 11/2008 |

* cited by examiner

*Primary Examiner* — Inder Mehra
(74) *Attorney, Agent, or Firm* — Hodgson Russ LLP (57) ABSTRACT

Provided are a location-based positioning method and system. The method comprises the following steps. A positioning request is received from a terminal and a location and a moving trajectory of the terminal are determined. A predicted trajectory is calculated according to the moving trajectory and road network information. A positioning request is received from the terminal at a position correction point, and a moving direction and a moving speed of the terminal is received in accordance with a location of the position correction point and the predicted trajectory. A next location of the terminal in the determined moving direction is determined based on the predicted trajectory.

20 Claims, 3 Drawing Sheets

LOCATION-BASED POSITIONING METHOD AND SYSTEM

TECHNICAL FIELD

The present disclosure relates to a mobile positioning technology, and in particular, to a location-based positioning method and system.

BACKGROUND

Mobile positioning refers to a technology or service that acquires location information (latitude and longitude coordinates) of a mobile phone or terminal user by using a specific positioning technology, and marks a location of the positioned object on an electronic map. There are currently three main positioning technologies, namely Global Positioning System (GPS), Base Station and Wireless Fidelity (WiFi), available to calculate a location of a user. Generally, positioning success rate, positioning precision and positioning speed are used to define performance of the three positioning technologies. The positioning success rate refers to a probability of successfully receiving positioning information after a positioning request signal is sent. The positioning precision refers to error between received poisoning information and actual location from which a positioning request signal is sent. The positioning speed refers to a time interval between a positioning request signal sent and corresponding positioning information received.

Using mobile phone-based positioning of a user as an example, GPS-based positioning locates a mobile phone by sending a position signal of the mobile phone, to a positioning background using a GPS positioning module on the mobile phone. The precision of the GPS positioning is high but the positioning speed is low. Base station-based positioning determines a location of a mobile phone by measuring and calculating a distance between the base station and the mobile phone. The base station-based positioning does not require that the mobile phone have GPS positioning capability. However, positioning precision largely relies on distribution and coverage of the base station to a great extent, sometimes with an error exceeding one kilometer. WiFi-based positioning refers to positioning within a small range by using WiFi. The positioning precision of the WiFi-based positioning is inferior only to the GPS positioning, but the speed is higher than the GPS positioning.

When a user enables the GPS, a location of the user is determined by using GPS. When the mobile phone of the user does not support GPS or GPS is not enabled, the location of the user is determined by using the base station or WiFi hotspot which currently serves the mobile phone. If a user is not within the coverage of a base station or WiFi, for example, a user is in a high speed train, car, or subway train, positioning information cannot be collected, and the positioning may fail, causing low positioning success rate. Even if the positioning is successful, the positioning precision and positioning speed cannot meet the positioning requirements of the user.

SUMMARY

To resolve the foregoing problem, the present disclosure provides a location based positioning method and system. According to the method and the system, positioning information on a trajectory is obtained according to location information, and if no positioning signal can be acquired, positioning service is provided by using the obtained positioning information. This improves positioning success rate, corrects the prefetched positioning information, and enhances positioning precision and positioning speed.

The specific technical solutions are as follows:

An embodiment of the present disclosure provides a location based positioning method, comprising:

S1. receiving a positioning request from a terminal, and determining a location and moving trajectory of the terminal;

S2. calculating a predicted trajectory according to the moving trajectory and road network information;

S3. receiving a positioning request at a position correction point from the terminal, and determining moving direction and a moving speed of the terminal according to the location of the position correction point and the predicted trajectory; and S4. determining, according to the moving direction and the moving speed of the terminal, a next location of the terminal in the determined moving direction based on the predicted trajectory.

According to an embodiment of the present disclosure, in S2, after the moving trajectory is interrupted, a route from the location of the terminal is acquired according to the road network information as the predicted trajectory.

According to an embodiment of the present disclosure, in S2, if the trajectory is associated with a route in a road network, the route is used as the predicted trajectory, which specifically comprises:

S201. acquiring or updating route information at the location of the terminal according to the moving trajectory;

S202. determining whether the location of the terminal is associated with a point of interest (POI) in the road network, if yes, performing S203, otherwise performing S204; wherein the POI is a route change point at which the route is changed or switched in the road network;

S203. acquiring a trajectory of a route at the POI as the predicted trajectory; and S204. using a route with which the trajectory coincides as the predicted trajectory.

According to an embodiment of the present disclosure, the trajectory being associated with a route in a road network comprises:

the trajectory being coinciding with the route; or the trajectory being moving to the route.

According to an embodiment of the present disclosure, the POI comprises a railway station, a highway station, and a road intersection.

According to an embodiment of the present disclosure, the position correction point is a point at which positioning can be achieved by using a GPS signal, a base station signal or a WiFi signal on the predicted trajectory.

According to an embodiment of the present disclosure, S3 specifically comprises:

S301. receiving the positioning request from the terminal at the position correction point, and recording the time when the terminal arrives at the position correction point for the first time and location of the position correction point;

S302. determining, according to the location of the position correction point, that the moving direction of the terminal is along the predicted trajectory towards the position correction point; and S303. calculating the moving speed of the terminal according to the time when the terminal arrives at the position correction point and the location of the position correction point.

According to an embodiment of the present disclosure, S4 specifically comprises:

S401. obtaining the predicted trajectory of the terminal in the determined moving direction according to the determined moving direction of the terminal;

S402. calculating, according to the moving speed of the terminal, a location at which the terminal may arrive at the next moment on the predicted trajectory; and S403. receiving a positioning request at the next moment, determining a location of the terminal at the next moment, and determining whether the location is on the predicted trajectory; if yes, using the location as an updated positioning location, otherwise, using the location calculated to be reached at the next moment as an updated positioning location.

According to an embodiment of the present disclosure, in S403, when receiving the positioning request at the next moment, if no positioning request is received in a fixed period for the terminal to send a positioning signal, the location calculated to be reached at the next moment is used as the updated positioning location.

According to an embodiment of the present disclosure, the trajectory of the terminal is determined according to an international mobile equipment identity (IMEI) number carried in the received positioning request.

Accordingly, an embodiment of the present disclosure provides a location-based positioning system, comprising:

a request receiving module, configured to receive a positioning request from a terminal, and determine a location and a moving trajectory of the terminal;

a trajectory predicting module, configured to calculate a predicted trajectory according to the moving trajectory and road network information;

a trajectory determining module, configured to, upon receiving a positioning request from the terminal at an position correction point, determine a moving direction and a moving speed of the terminal according to a location of the position correction point and the predicted trajectory; and a positioning module, configured to determine, according to the moving direction and the moving speed of the terminal, a next location of the terminal in the determined moving direction based on the predicted trajectory.

According to an embodiment of the present disclosure, after the moving trajectory is interrupted, the trajectory predicting module acquires a route from the location of the terminal according to the road network information and uses the route as the predicted trajectory.

According to an embodiment of the present disclosure, if the trajectory is associated with a route in the road network, the trajectory predicting module using the route as the predicted trajectory specifically comprises:

an updating module, configured to acquire or update route information at the location of the terminal according to the moving trajectory;

an associating module, configured to determine whether the location of the terminal is associated with a POI in the road network; and a trajectory fetching module, configured to: fetch the road network information according to an association result from the associating module as the predicted trajectory; if the trajectory is associated with a route in the road network, fetch a trajectory of a route at the POI as the predicted trajectory; and if the trajectory is not associated with a route in the road network, fetch the route with which the trajectory coincides as the predicted trajectory.

According to an embodiment of the present disclosure, the association of the trajectory with the route in the road network comprises:

the trajectory being coinciding with the route; or the trajectory being moving to the route.

According to an embodiment of the present disclosure, the POI comprises a railway station, a highway station, and a road intersection.

According to an embodiment of the present disclosure, the position correction point is a point at which positioning can be achieved by using a GPS signal, a base station signal, or a WiFi hotspot signal.

According to an embodiment of the present disclosure, the trajectory determining module specifically comprises:

a direction determining module, configured to determine, according to the positioning request received by the request receiving module at the position correction point, that the moving direction of the terminal is along the predicted trajectory towards the position correction point; and a speed calculating module, configured to calculate the moving speed of the terminal according to the positioning request received by the request receiving module at the position correction point.

According to an embodiment of the present disclosure, the positioning module specifically comprises:

a trajectory obtaining module, configured to obtain the predicted trajectory of the terminal in the determined moving direction according to the moving direction determined by the trajectory determining module;

a location obtaining module, configured to calculate, according to the moving speed calculated by the trajectory determining module, a location to be reached at a next moment on the predicted trajectory; and a location determining module, configured to: receive a positioning request at a next moment, determine a location of the terminal at the next moment, and determine whether the location is on the predicted trajectory; if yes, use the location as an updated positioning location, otherwise, use the location calculated to be reached at the next moment as an updated positioning location.

According to an embodiment of the present disclosure, when receiving the positioning request by the location determining module at the next moment, if no positioning request is received in a fixed period for the terminal to send a positioning signal, the location determining module uses the location calculated to be reached at the next moment as the updated positioning location.

According to an embodiment of the present disclosure, the request receiving module determines the trajectory of the terminal according to an IMEI number contained and carried in the received positioning request.

As can be seen from the foregoing technical solutions, the present disclosure provides a location-based positioning method and system, which predict trajectory of a user according to location information of the user, obtains positioning information on the trajectory, provides positioning service for a user who cannot acquire location information. The method and system can also provide location information display results and improve positioning success rate. In circumstances positioning signal is difficult to acquire, location service is rendered by location obtaining, and when positioning signal is available, erroneous location information can be corrected in a timely manner. In this way, positioning precision and positioning speed are enhanced.

DETAILED DESCRIPTION

To make the objectives, technical solutions, and advantages of the present disclosure clearer, the present disclosure is described in detail with reference to accompanying drawings and specific embodiments.

Figure 1:
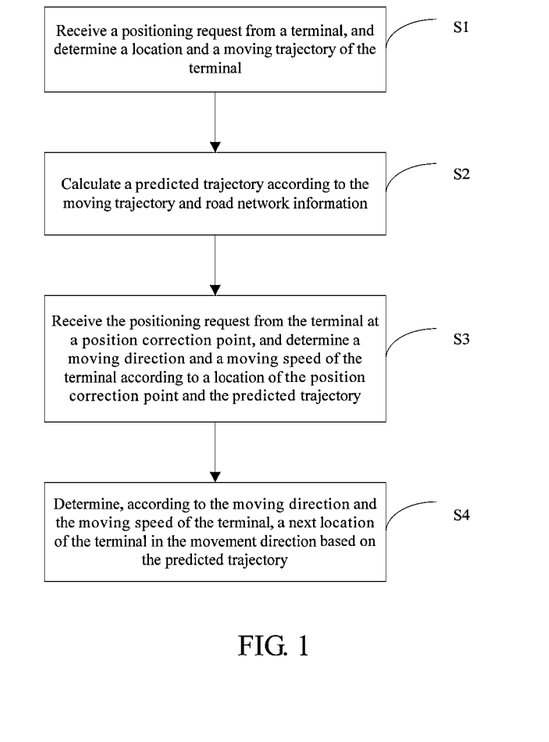
FIG. 1 is a flowchart of a location-based positioning method according to an embodiment of the present disclosure.
Figure 2:
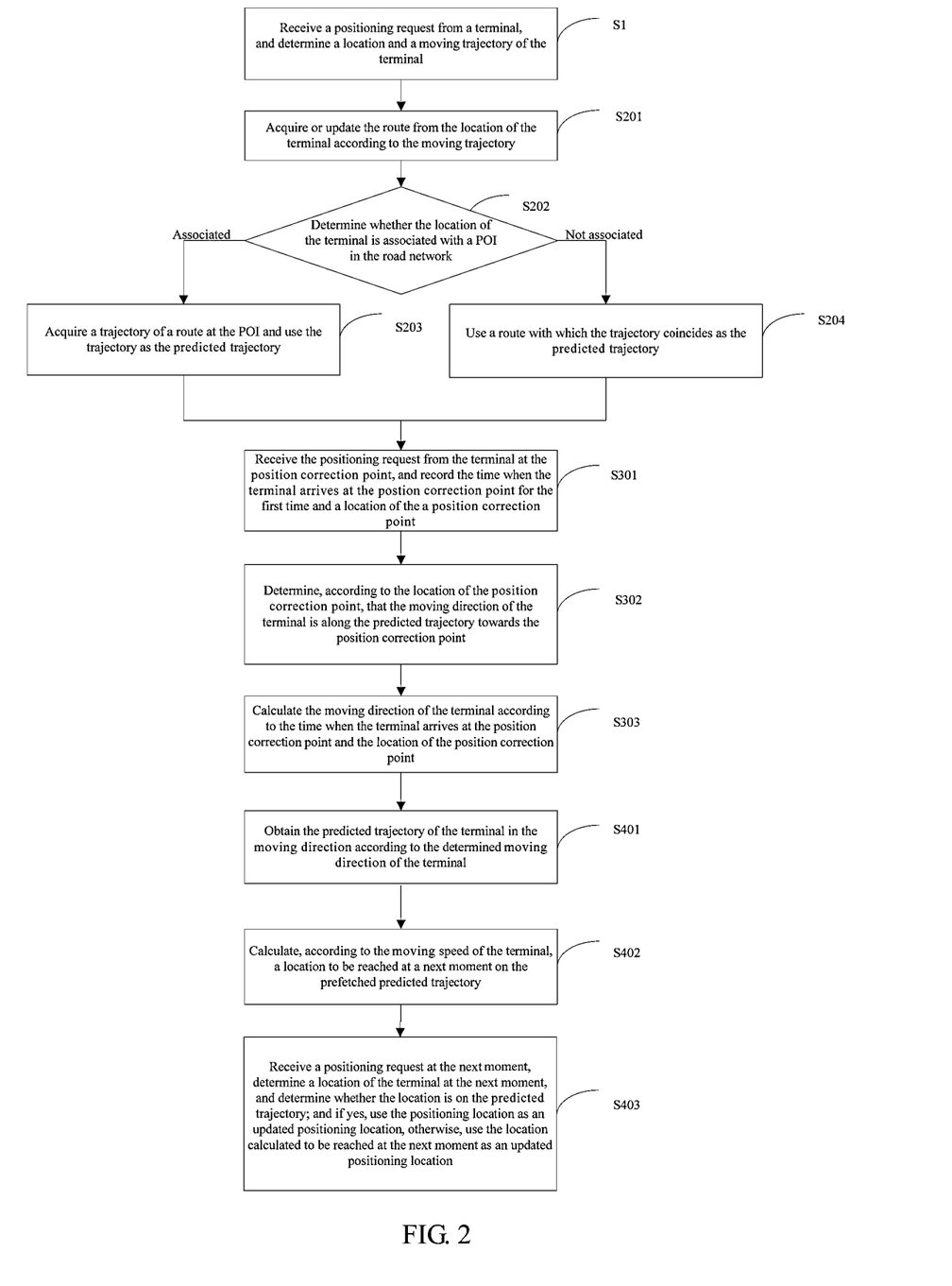
FIG. 2 is a specific flowchart of a location-based positioning method according to an embodiment of the present disclosure.

The present disclosure provides a location-based positioning method, as illustrated in FIG. 1 and FIG. 2, comprising the following steps:

S1. Receiving a positioning request from a terminal, and determining a location and a moving trajectory of the terminal.

After the positioning request is received from the terminal, the location information of the terminal may be determined. Distance traveled and time elapsed between two positioning locations are acquired by positioning twice, and thus moving direction and speed of the terminal may be acquired by calculation, thereby implementing tracing of the trajectory of the terminal. After a plurality of times of positioning, the determined trajectory is relatively accurate.

The positioning request may be received by using GPS, base station, or WiFi hotspot, which may be switched therebetween when a signal state changes.

S2. Calculating a predicted trajectory according to the moving trajectory and road network information.

The road network information may be road network data information provided by a transportation information center or a road network database which is built by pre-pre-collecting or pre-gathering positioning information of railways, highways, and other roads and calculating coordinate information along the railways and highways as well as running speed in each of the roads. The road network information is comprised of various categories and classes of transportation networks, generally comprising various roads such as primary and secondary trunk roads, branch roads, railway transportations (for example, subway railway and light railway), express roads, and highways. These roads are marked on a map according to such data as geometric shapes, lengths, road identifiers, and POIs thereof.

During the process of movement, a terminal user is most likely to move along the direction of a road, and the moving direction and moving speed of the terminal user may be better confined to the railways and roads. Therefore, during the positioning process, location prediction can be conducted with the aid route in the road network. The route comprises railways, highways, and roads.

In this step, location prediction with the aid of routes in the road network can be conducted in case the trajectory of the terminal user is interrupted, i.e., when a positioning request signal temporarily fails to be received, the route from the location of the terminal is acquired according to the road network information according to the trajectory and used as the predicted trajectory.

Alternatively, location prediction with the aid of routes in the road network can be conducted at any time, and if the trajectory is associated with the route in the road network, the route is used as the predicted trajectory. The association of the trajectory with the route in the road network comprises: the trajectory being coinciding with the route; or the trajectory being moving to the route.

If the trajectory is associated with a route in the road network, using a route as predicted trajectory specifically comprises the following steps:

S201. Acquiring or updating route information at the location of the terminal according to the moving trajectory.

According to the determined location of the terminal, road network information at the location of the terminal at the next moment is acquired according to the road network information, comprising data relevant to various roads such as railways and roads within a specific range centering the location, for example, coordinates of the railways and running speed thereof.

S202. Determining whether the location of the terminal is associated with a POI in the road network; if yes, performing S203, otherwise, performing S204.

The POI in the road network is a route change point at which the route is changed or switched, generally comprising railway stations, highway stations, and road intersections, for example, names of subway stations, crossroads, road forks and the like. For example, names of subway stations such as "Zhongguancun", and "Xizhimen", names of crossroads such as "Jimenqiao".

It is determined whether coordinate information of the location of the terminal is consistent with coordinate information of the POI; and if yes, it is considered that the location of the terminal is associated with the POI in the road network. In practice, an appropriate error range may be set. If the distance between the two coordinates is smaller than the error range, it is determined that the coordinate information of the location of the terminal is consistent with the coordinate information of the POI.

S203. Fetching a trajectory of a route at the POI as the predicted trajectory.

In case where the location of the terminal is associated with the POI, the moving direction of the terminal may change. The most possible moving direction is along the route. Therefore, a trajectory of the route at the POI is fetched and used as the predicted trajectory.

For example, if the location of the terminal is associated with the POI of a subway station, a running trajectory of the subway train at the subway station is fetched and used as the predicted trajectory. If the location is associated with the POI at a highway toll gate, the highway where the highway toll gate is located is fetched and used as the predicted trajectory. If the POI comprises various types of routes, all relevant routes at the POI are fetched and used as the predicted trajectory.

S204. Using a route with which the trajectory coincides as the predicted trajectory.

If the location of the terminal is not associated with a POI, it can be determined that the terminal is moving on the route. In this case, the moving direction of the terminal usually does not change, and the terminal would continue moving along the original moving direction. Therefore, the route with which the trajectory coincides is fetched and used as the predicted trajectory. For example, if a previously traced trajectory is on the "North Third Ring Road West" in the road network, the route "North Third Ring Road West" is fetched and used as the predicted trajectory.

S3. Receiving a positioning request from the terminal at a position correction point, and determining a moving direction and a moving speed of the terminal according to location of the position correction point and the predicted trajectory.

Since the predicted trajectory may involve a plurality of directions, in this case the moving direction of the terminal cannot be determined, and needs to be determined by further receiving a positioning request signal. In this process, the moving direction of the terminal can be determined as long as another positioning request is received.

In one embodiment, the positioning request is received at the position correction point. The position correction point is a point at which positioning can be achieved by using a GPS signal, a base station signal, or a WiFi hotspot signal on the predicted trajectory. Several position correction points are set up on each predicted trajectory, so that a predicted location is determined and the moving direction and moving speed of the terminal are calculated. The position correction points are points located along the predicted trajectory, which may be set up at a certain distance (for example, several meters or tens of meters) between them. Position correction points may also be set up on all possible moving directions on the predicted trajectory.

Preferably, S3 specifically comprises the following steps:

S301. Receiving a positioning request from the terminal at an position correction point, and recording the time when the terminal arrives at the position correction point for the first time and location of the position correction point.

S302. Determining, according to the location of the position correction point, that the moving direction of the terminal is along the predicted trajectory towards the position correction point.

S303. Calculating the moving speed of the terminal according to the time when the terminal arrives at the position correction point and the location of the position correction point.

The position correction points are points set up in various directions on the trajectory. When a terminal arrives at a position correction point on the trajectory, the moving direction of the terminal may be determined, and meanwhile the moving speed may be acquired according to the time interval and distance relevant to the location.

If the positioning location of the terminal is not on a position correction point according to the received positioning request, it may be firstly determined whether the positioning location is on a selected predicted trajectory. If the positioning location is on the selected predicted trajectory, the moving direction of the terminal is determined according to the positioning location, and the moving speed is acquired by calculation according to the positioning location and the time interval. If the positioning location is not on any predicted trajectory, a direction closest to the positioning location on the predicted trajectory is determined as the moving direction of the terminal according to the positioning location; and a pre-stored average speed on the trajectory may be temporarily taken as moving speed, or the moving speed is calculated according to a projection distance and a time interval in the determined direction of the trajectory.

S4. Determining, according to the moving direction and the moving speed of the terminal, a next location of the terminal in the determined moving direction based on the predicted trajectory.

Specifically, S4 comprises the following steps:

S401. Obtaining the predicted trajectory of the terminal in the determined moving direction according to the determined moving direction of the terminal.

After the moving direction of the terminal is determined, the predicted trajectory in the moving direction is selected as the trajectory of the terminal for location-based positioning, and data of the trajectory in other directions may be discarded.

S402. Calculating, according to the moving speed of the terminal, a location to be reached at a next moment on the predicted trajectory.

S403. Receiving a positioning request at the next moment, determining a location of the terminal at the next moment, and determining whether the location is on the predicted trajectory; if yes, using the location as an updated location, otherwise, using the location calculated to be reached at the next moment as an updated positioning location.

In this process, when receiving the positioning request at the next moment, if no positioning request is received in a fixed period for the terminal to send a positioning signal, it is considered that no positioning signal is available, and the location calculated to be reached at the next moment is used as the updated positioning location.

It should be noted that the location obtaining is performed in a continuous way. By using the location information and trajectory at the current moment, the trajectory of the terminal is acquired by prediction with the aid of trajectory of the route in the road network. The moving direction and speed on the trajectory are determined by receiving another positioning request, and meanwhile a predicted location at the next moment is updated and corrected.

Embodiment 1

Figure 3:
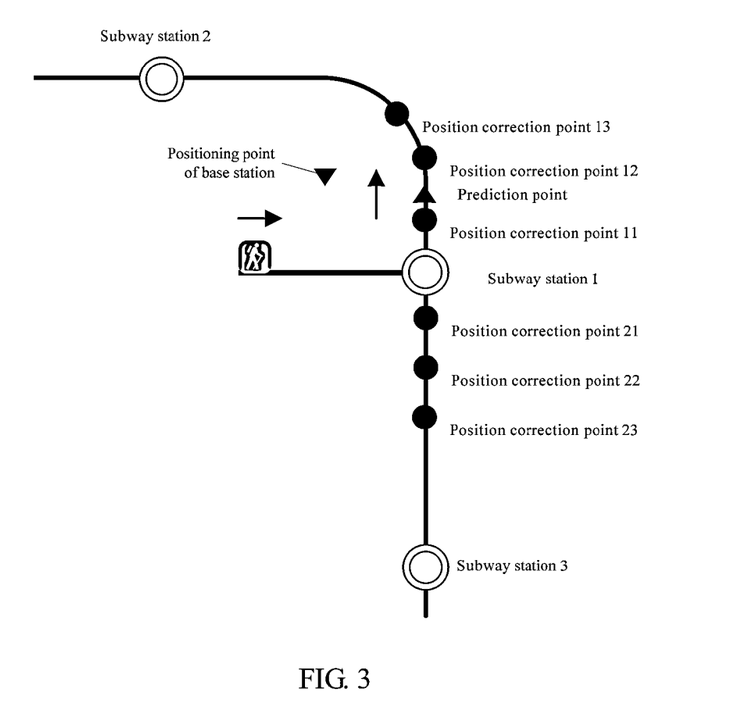
FIG. 3 is a schematic diagram of a route according to Embodiment 1 of the present disclosure.

As illustrated in FIG. 3, a scenario in which a phone user takes subway is used as an example, and a diagram of a route traveled by the user heading for the subway station 1 is shown.

Firstly, a positioning request is received from a user, a location of the user is determined, moving direction and speed of the user are recorded, and moving trajectory of the user is traced.

The trajectory of the user is identified with an IMEI number carried in the received positioning request. The IMEI, an abbreviation of international mobile equipment identity, refers to an "electronic serial number" consisting of 15 digits, which is used to uniquely identify a mobile phone. The positioning request sent by the user carries the IMEI number of the mobile phone of the user.

The positioning request of the user is continuously sent at a time interval, generally at an interval of 0.5 s or 1 s. The location, direction, speed, and other parameters of the user are determined according to the positioning request sent by the user. It is determined that the trajectory of the user is approaching the subway station. When the user enters the subway station, it can be determined, according to the trajectory, that the user enters the subway station rather than coming out from the subway station.

Before the user enters the subway station, the GPS satellite is available for the mobile phone of the user, and GPS is preferably used to locate the user. After the user enters the subway station, the GPS satellite is not available and base station signal or WiFi hotspot signal is used to locate the user.

When the user has entered the subway station, it may be determined that at the time a positioning coordinate of the user is associated with a POI (coordinate information of the subway station) in the road network. The associated POI is subway station 1, which is a subway station name. Geographic locations along the subway railway extending from subway station 1 in the road network is fetched and used as a predicted trajectory of the user, and several position correction points, for example, position correction points 11, 12, 13, 21, 22, and 23 as shown in FIG. 3, are set up along the trajectory. The position correction points are positions within coverage of positioning signals. The positioning signal may be a GPS signal, a base station signal, or a WiFi signal.

Positioning information along railways and highways is pre-collected or pre-gathered, corresponding coordinates are calculated accordingly and stored as the road network information. Therefore, location coordinate information along the subway railways and average running speed of each of the sections of the subway railways are pre-stored as the road network information.

After the coordinate information along the subway railways is acquired and before moving direction of the user is determined, position correction points need to be set up in all possible moving directions. Direction in which a position correction point needing to be set up is determined based on a possible moving direction of the subway train. If the subway train has two moving directions, position correction points are set up in the two directions. The position correction points are points located along the subway railways, which may be set up at a certain distance (for example, several meters or tens of meters) between them. The subway railway in FIG. 3 has two directions and there are position correction points 11, 12, 13, 21, 22, 23 along the subway railway. If the subway has four moving directions, position correction points are set up in the four moving directions. Similarly, if there are N (N is a positive integer) directions of a route in the road network, position correction points may be set up in each of the N directions.

A positioning request from the user is received at a position correction point, and moving direction of the user is determined according to the location of the position correction points which has received the positioning request. When the position correction point receives the positioning request for the first time, the time when the terminal arrives at the position correction point for the first time and the location of the position correction point are recorded. For example, as illustrated in FIG. 3, when the user arrives at the position correction point 11, it is determined, according to the location information and time with respect to the position correction point 11, that the moving direction of the user is from subway station 1 to the position correction point 11 along the subway railway, i.e., from subway station 1 to subway station 2. Meanwhile, the moving speed of the user is calculated according to the location and arrival time with respect to the position correction point 1 on the subway railway.

If it is determined that the moving direction of the user is from subway station 1 to subway station 2, coordinate information of the subway railway in that direction is obtained, and meanwhile coordinate information of the subway railway in other directions is discarded. By doing so only coordinate information in one moving direction is retained.

According to the calculated moving speed, a location to be reached at a next moment on the subway railway is calculated. When a positioning request is received at the next moment, a location of the user is determined, and it is determined whether the location is on the predicted trajectory; if yes, the location is used as an updated positioning location, otherwise, the location calculated to be reached at the next moment is used as an updated positioning location.

When receiving the positioning request at the next moment, if no positioning request is received in a fixed period for the terminal to send a positioning signal, it is considered that no positioning signal is available, and the location calculated to be reached at the next moment is used as the updated positioning location.

In addition, when the subway train runs, the positioning signal in the high-speed train is probably poor, and sometimes communication may be interrupted. Since the user is moving along the subway railway, location information of the user can be predicted according to the moving direction and moving speed of the user. The predicted location information is displayed during temporary interruption of communication, and the predicted location information is corrected by a second positioning when the positioning information is available and meanwhile the moving speed of the user is calculated in real time for location obtaining and position correction at a next moment. Even if the moving speed and moving direction of the user cannot be calculated in real time, a location to be reached at a next moment may also be predicted according to an average running speed of all the sections of the subway railway. In case the moving direction cannot be determined, a random direction may be used to predict location of the user. Since the temporary communication interruption may not last too long, prediction may be implemented according to the state of motion, thereby enhancing positioning success rate and positioning speed. When a positioning signal is available again, the positioned location information may be corrected.

Embodiment 2

When a user travels on a subway train, since no GPS satellite is available and thus GPS positioning cannot be used, positioning is generally implemented by using a base station. Before the location-based positioning method is employed, since positioning precision of the base station is not high, it may be possible that a user who is actually on the subway train is located in an area in the vicinity of the subway train. A location determined by base station is shown in FIG. 3.

According to the present disclosure, by means of location obtaining, it can be predicted that the user moves along the subway railway, and the location determined by base station as shown in FIG. 3 is corrected as on the subway train. According to the location determined by the base station, it can be determined that the moving direction of the user is from subway station 1 to subway station 2. However, at this time, it cannot be determined which point on the subway railway the user arrives. In this case, the location information of the user on the subway railway as "predicted location" shown in FIG. 3 can be calculated according to the pre-stored running speed of the subway train and time consumed by the subway train travelling from subway station 1 to subway station 2.

According to the present disclosure, positioning results can be well corrected in case the positioning precision of the base station is low by means of location obtaining with the aid of road and railway network information. This prevents the case the user actually on the subway train is positioned in the vicinity of the subway train, and thereby enhances positioning precision.

Figure 4:
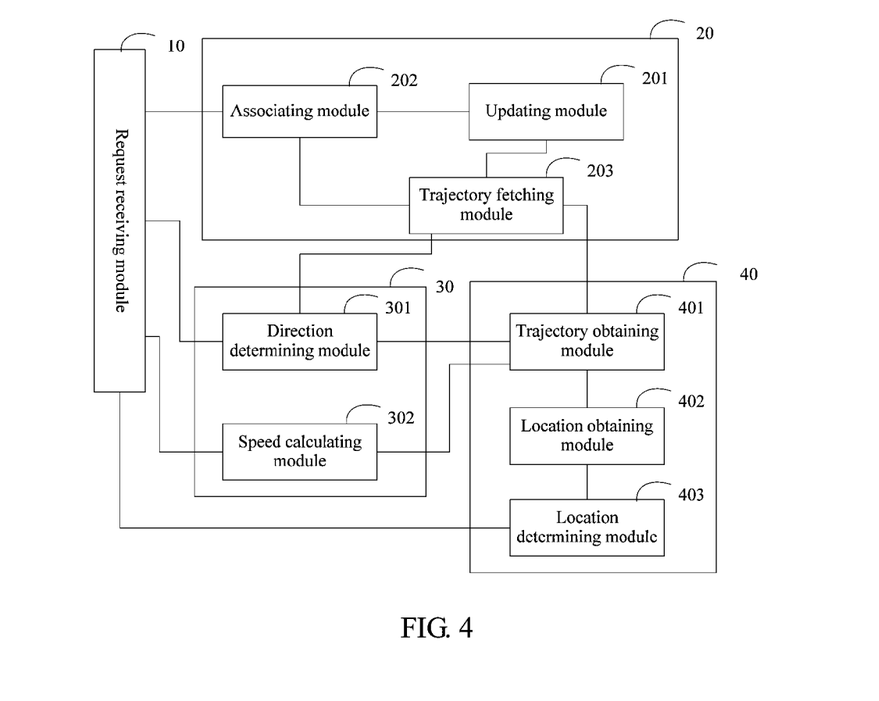
FIG. 4 is a block diagram of a location-based positioning system according to an embodiment of the present disclosure.

Correspondingly, the present disclosure provides a location-based positioning system, as illustrated in FIG. 4, comprising: a request receiving module 10, a trajectory predicting module 20, a trajectory determining module, and a positioning module 40.

The request receiving module 10 is configured to receive a positioning request from a terminal, and determine a location and a moving trajectory of the terminal.

In the positioning system, after the request receiving module 10 receives the positioning request from the terminal, the location information of the terminal may be determined. Distance and time with respect to two positioning locations are acquired by means of at least two times of positioning, and thus moving direction and speed of the terminal may be acquired by calculation, thereby implementing tracing of the trajectory of the terminal. After a plurality of times of positioning, the determined trajectory is relatively accurate.

The positioning request may be received by using GPS, base station, or WiFi hotspot, which may be switched therebetween in the positioning system when a signal state changes.

The request receiving module 10 identifies the moving trajectory of the terminal according to an IMEI number carried in the received positioning request.

The trajectory predicting module 20 is configured to calculate a predicted trajectory according to the moving trajectory and road network information.

The road network information may be road network data information provided by a transportation information center or a road network database which is built by pre-collecting or pre-gathering positioning information of railways, highways, and other roads and calculating coordinate information along the railways and highways as well as running speed in each of the roads. The road network information is comprised of various categories and classes of transportation networks, generally comprising various roads such as primary and secondary trunk roads, branch roads, railway transportations (for example, subway railway and light railway), express roads, and highways. These roads are marked on a map according to such data as geometric shapes, lengths, road identifiers, and POIs thereof.

During the process of movement, a terminal user is most likely to move along the direction of a road, and the moving direction and moving speed of the terminal user may be better confined to the railways and roads. Therefore, during the positioning process, location prediction can be conducted with the aid route in the road network. The route comprises railways, highways, and roads.

The trajectory predicting module 20 acquires the route from the location of the terminal according to the road network information according to the trajectory and uses the acquired route as the predicted trajectory, only after the trajectory is interrupted, i.e., when a positioning request signal temporarily fails to be received.

Alternatively, the trajectory predicting module 20 uses the route as the predicted trajectory when the trajectory is associated with the route in the road network. In this case, the association of the trajectory with the route in the road network comprises: the trajectory being coinciding with the route; or the trajectory being moving to the route. In this case, the trajectory predicting module 20 specifically comprises: an updating module 201, an associating module 202, and a trajectory fetching module 203.

The updating module 201 is configured to acquire or update route information at the location of the terminal according to the moving trajectory.

The road network information module 201 acquires, according to the determined location of the terminal, road network information of the terminal at the location according to the road network information, comprising data relevant to various roads such as railways, and roads within a specific range centering the location.

The associating module 202 is configured to determine whether the location of the terminal at the next moment determined by the request receiving module 10 is associated with a POI in the road network of the route acquired by the road network information module 201.

The POI is a route change point at which the route is changed or switched in the road network information, generally comprising railway stations, highway stations, and road intersections, for example, names of subway stations, crossroads, road forks and the like. For example, names of subway stations such as "Zhongguancun", and "Xizhimen", names of crossroads such as "Jimenqiao".

The associating module 202 determines whether coordinate information of the location of the terminal is consistent with coordinate information of the POI; and if consistent, the associating module 202 considers that the location of the terminal is associated with the POI. In practice, an appropriate error range may be set. If the distance between the two coordinates is smaller than the error range, it is determined that the coordinate information of the location of the terminal is consistent with the coordinate information of the POI.

The trajectory fetching module 203 is configured to: fetch the road network information according to an association result from the associating module, and use the road network information as the predicted trajectory; if associated, fetch a trajectory of a route at the POI and use the trajectory as the predicted trajectory; and if not associated, obtain the route where the trajectory is located and use the route as the predicted trajectory.

When the trajectory fetching module 203 determines that the location of the terminal at the next moment is associated with the POI, the moving direction of the terminal may change. The most possible moving direction is a direction along the route. Therefore, the trajectory of the route at the POI is fetched and used as the predicted trajectory.

For example, if the location of the terminal is associated with the POI of the subway station, a subway train running trajectory at the subway station is fetched and used as the predicted trajectory. If the location is associated with the POI at a highway toll gate, the highway where the highway toll gate is located is fetched and used as the predicted trajectory. If the POI comprises various types of routes, all relevant routes at the POI are fetched and used as the predicted trajectory.

When the trajectory fetching module 203 determines that the location of the terminal is not associated with the POI, the moving trajectory of the terminal is moving on the route. In this case, the moving direction of the terminal generally does not change, and the terminal continues moving along the original moving direction. Therefore, the route where the moving trajectory is located is fetched and used as the predicted trajectory. For example, if a previously traced trajectory is the "North Third Ring Road West" in the road network information, the route "North Third Ring Road West" is fetched and used as the predicted trajectory.

The trajectory determining module 30 is configured to, upon receiving the positioning request received by the request receiving module 10 at a position correction point, determine a moving direction and a moving speed of the terminal according to a location of the position correction point and the predicted trajectory.

Since the predicted trajectory may involve a plurality of directions, in this case the moving direction of the terminal cannot be determined, and needs to be determined by further receiving a positioning request signal by the trajectory determining module 30. In this process, the positioning system determines the moving direction of the terminal as long as another positioning request is received.

One possible implementation is receiving the positioning request at the position correction point. The position correction point is a point at which positioning can be achieved by using a GPS signal by using a GPS signal, a base station signal, or a WiFi hotspot signal. Several position correction points are set up on each predicted trajectory, so that a predicted location is determined and the moving direction and moving speed of the terminal are calculated. The position correction points are points located along the subway railways, which may be set up at a certain distance (for example, several meters or tens of meters) between them. Position correction points may be set up on all possible moving directions on the predicted trajectory.

The trajectory determining module 30 specifically comprises:

a direction determining module 301, configured to determine, according to the positioning request received by the request receiving module 10 at the position correction point, that the moving direction of the terminal is along the predicted trajectory towards the position correction point; and a speed calculating module 302, configured to calculate the moving speed of the terminal according to the positioning request received by the request receiving module 10 at the position correction point.

In one embodiment, the direction determining module 301 and the speed calculating module 302 perform calculation according to the recorded time when the terminal arrives at a position correction point for the first time and the location of the position correction point. The direction determining module 301 determines, according to the recorded location, that the moving direction of the terminal is along the predicted trajectory towards the position correction point. The speed calculating module 302 calculates the moving speed of the terminal according to the time when the terminal arrives at the position correction point and the location of the position correction point.

The position correction points are points set up in various directions on the trajectory. When the terminal arrives at an position correction point on the trajectory, the moving direction may be determined, and meanwhile the moving speed may be acquired according to the time interval and distance relevant to the location.

If the positioning location of the terminal is not on an position correction point according to the received positioning request, it may be firstly determined whether the positioning location is on a selected predicted trajectory. If the positioning location is on the selected predicted trajectory, the moving direction of the terminal is determined according to the positioning location, and the moving speed is acquired by calculation according to the positioning location and the time interval. If the positioning location is not on any predicted trajectory, a direction closest to the positioning location on the predicted trajectory is determined as the moving direction of the terminal according to the positioning location; and a pre-stored average speed on the trajectory may be temporarily taken as moving speed, or the moving speed is calculated according to a projection distance and a time interval in the determined direction of the trajectory The positioning module 40 is configured to obtain, according to the moving direction and the moving speed of the terminal, a predicted trajectory of the terminal in the determined moving direction for positioning. The positioning module 40 specifically comprises: a trajectory obtaining module 401, a location obtaining module 402, and a location determining module 403.

The trajectory obtaining module 401 is configured to obtain the predicted trajectory of the terminal in determined the moving direction according to the moving direction determined by the trajectory determining module.

After the trajectory determining module 30 determines the moving direction of the terminal, the trajectory obtaining module 401 selects the predicted trajectory in the moving direction as the trajectory of the terminal for the location-based positioning, and may discard trajectory data in other directions.

The location obtaining module 402 is configured to calculate, according to the moving speed calculated by the trajectory determining module, a location to be reached at a next moment on the predicted trajectory.

The location determining module 403 is configured to: receive a positioning request at a next moment, determine a location of the terminal at the next moment, and determine whether the location is on the predicted trajectory; and if yes, use the location as an updated positioning location, otherwise, use the location calculated to be reached at the next moment as an updated positioning location.

When receiving the positioning request by the location determining module 403 at the next moment, if the positioning request is not received in a fixed period for the terminal to send a positioning signal, it is considered that no positioning signal is available, and the location determining module 403 uses the location calculated to be reached at the next moment as the updated positioning location.

It should be noted that the location p obtaining is performed in a continuous way. By using the location information and trajectory at the current moment, the trajectory of the terminal is acquired by prediction with the aid of trajectory of the route in the road network. The moving direction and speed on the moving trajectory are determined by receiving another positioning request, and meanwhile a predicted location at the next moment is updated and corrected According to the positioning method and system provided in the present disclosure, a moving trajectory of a user is predicted according to a location of the user, various locations on the trajectory are pre-calculated for subsequent positioning, positioning information is obtained on the trajectory, and meanwhile several locations are set up as position correction points, thereby providing a positioning service for a user who fails to be positioned on the moving route, and enhancing positioning success rate; positioning deviation points are corrected, thereby enhancing positioning precision; and in a case of no available positioning information, positioning is conducted by using the obtained positioning information, thereby reducing time for waiting for a positioning signal during a location information display process, and enhancing positioning speed. The present disclosure is obviously significant in a case of no available positioning signals (GPS signals, base station signals, and WiFi signals) or weak positioning signals, especially for railways and highways.

Detailed above are merely preferred embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A location-based positioning method, comprising:
   S1. receiving a positioning request from a terminal, and determining a location and a moving trajectory of the terminal;
   S2. calculating a predicted trajectory according to the moving trajectory and road network information;
   S3. receiving a positioning request from the terminal at a position correction point, and determining a moving direction and a moving speed of the terminal according to a location of the position correction point and the predicted trajectory; and
   S4. determining, according to the moving direction and the moving speed of the terminal, a next location of the terminal in the determined moving direction based on the predicted trajectory.

2. The method according to claim 1, wherein in S2, after the moving trajectory is interrupted, a route from the location of the terminal is acquired according to the road network information and used as the predicted trajectory.

3. The method according to claim 2, wherein in S2, if the trajectory is associated with a route in a road network, using the route as the predicted trajectory specifically comprises:
S201. acquiring or updating route information at the location of the terminal according to the moving trajectory;
S202. determining whether the location of the terminal is associated with a POI in the road network, if yes, performing S203, otherwise, performing S204, wherein the POI is a route change point at which the route is changed or switched in the road network;
S203. acquiring a trajectory of a route at the POI as the predicted trajectory; and
S204. using a route with which the trajectory coincides as the predicted trajectory.

4. The method according to claim 3, wherein the trajectory being associated with a route in a road network comprises:
the trajectory being coinciding with the route; or
the trajectory being moving to the route.

5. The method according to claim 3, wherein the POI comprises a railway station, a highway station and a road intersection.

6. The method according to claim 1, wherein the position correction point is a point at which positioning can be achieved by using a GPS signal, a base station signal, or a WiFi hotspot signal on the predicted trajectory.

7. The method according to claim 1, wherein S3 specifically comprises:
S301. receiving the positioning request from the terminal at the position correction point, and recording the time when the terminal arrives at the position correction point for the first time and the location of the position correction point;
S302. determining, according to the location of the position correction point, that the moving direction of the terminal is along the predicted trajectory towards the position correction point; and
S303. calculating the moving speed of the terminal according to the time when the terminal arrives at the position correction point and the location of the position correction point.

8. The method according to claim 1, wherein S4 specifically comprises:
S401. obtaining the predicted trajectory of the terminal in the determined moving direction of the terminal;
S402. calculating, according to the moving speed of the terminal, a location to be reached at a next moment on the predicted trajectory; and
S403. receiving a positioning request at the next moment, determining a location of the terminal at the next moment, and determining whether the location is on the predicted trajectory;
if yes, using the location as an updated positioning location, otherwise, using the location calculated to be reached at the next moment as an updated positioning location.

9. The method according to claim 8, wherein in S403, when receiving the positioning request at the next moment, if the positioning request is not received in a fixed period for the terminal to send a positioning signal, the location calculated to be reached at the next moment is used as the updated positioning location.

10. The method according to claim 1, wherein the trajectory of the terminal is identified with an IMEI number contained in the received positioning request.

11. A location-based positioning system, comprising:
a request receiving module, configured to receive a positioning request from a terminal, and determine a location and a moving trajectory of the terminal;
a trajectory predicting module, configured to calculate a predicted trajectory according to the moving trajectory and road network information;
a trajectory determining module, configured to, upon receiving a positioning request from the terminal at an position correction point, determine a moving direction and a moving speed of the terminal according to a location of the position correction point and the predicted trajectory; and
a positioning module, configured to determine, according to the moving direction and the moving speed of the terminal, a next location of the terminal in the determined moving direction based on the predicted trajectory.

12. The system according to claim 11, wherein after the moving trajectory is interrupted, the trajectory predicting module acquires a route from the location of the terminal according to the road network information and uses the route as the predicted trajectory.

13. The system according to claim 11, wherein if the trajectory is associated with a route in a road network, the trajectory predicting module using the route as the predicted trajectory specifically comprises:
an updating module, configured to acquire or update route information at the location of the terminal according to the moving trajectory;
an associating module, configured to determine whether the location of the terminal is associated with a POI in the road network; and
a trajectory fetching module, configured to: fetch the road network information according to an association result from the associating module, and use the road network information as the predicted trajectory; if associated, fetch a trajectory of a route at the POI and use the trajectory as the predicted trajectory; and if not associated, use the route with which the trajectory coincides as the predicted trajectory.

14. The system according to claim 13, wherein the association of the trajectory with a route in the road network comprises:
the trajectory being coinciding with a route; or
the trajectory being moving to the route.

15. The system according to claim 13, wherein the POI comprises a railway station, a highway station, and a road intersection.

16. The system according to claim 11, wherein the position correction point is a point at which positioning can be achieved by using a GPS signal, a base station signal, or a WiFi hotspot signal.

17. The system according to claim 11, wherein the trajectory determining module specifically comprises:
a direction determining module, configured to determine, according to the positioning request received by the request receiving module at the position correction point, that the moving direction of the terminal is along the predicted trajectory towards the position correction point; and
a speed calculating module, configured to calculate the moving speed of the terminal according to the positioning request received by the request receiving module at the position correction point.

18. The system according to claim 11, wherein the positioning module specifically comprises:

a trajectory obtaining module, configured to obtain the predicted trajectory of the terminal in the determined moving direction according to the moving direction determined by the trajectory determining module;

a location obtaining module, configured to calculate, according to the moving speed calculated by the trajectory determining module, a location to be reached at a next moment on the predicted trajectory; and a location determining module, configured to: receive a positioning request at a next moment, determine a location of the terminal at the next moment, and determine whether the location is on the predicted trajectory; if yes, use the location as an updated positioning location, otherwise, use the location calculated to be reached at the next moment as an updated positioning location.

19. The system according to claim 11, wherein when receiving the positioning request by the location determining module at a next moment, if the positioning request is not received in a fixed period for the terminal to send a positioning signal, the location determining module uses the location calculated to be reached at the next moment as the updated positioning location.

20. A location-based positioning method, comprising

S1. receiving a positioning request from a terminal, and determining a location and a moving trajectory of the terminal;

S2. calculating a predicted trajectory according to the moving trajectory and road network information;

S3. receiving a positioning request from the terminal at a position correction point, and determining a moving direction and a moving speed of the terminal according to a location of the position correction point and the predicted trajectory; and S4. determining, according to the moving direction and the moving speed of the terminal, a next location of the terminal in the determined moving direction based on the predicted trajectory;

wherein in S2, after the moving trajectory is interrupted, a route from the location of the terminal is acquired according to the road network information and used as the predicted trajectory.

* * * * *